(12) United States Patent
Iwamoto et al.

(10) Patent No.: US 8,934,224 B2
(45) Date of Patent: Jan. 13, 2015

(54) ELECTRONIC DEVICE

(75) Inventors: Akira Iwamoto, Osaka (JP); Jun Sato, Osaka (JP); Ryo Yonezawa, Kyoto (JP); Toshiya Senoh, Nara (JP); Kenichi Shindo, Osaka (JP); Masashi Toyota, Osaka (JP)

(73) Assignee: Panasonic Corporation, Osaka (JP)

( * ) Notice: Subject to any disclaimer, the term of this patent is extended or adjusted under 35 U.S.C. 154(b) by 225 days.

(21) Appl. No.: 13/572,314

(22) Filed: Aug. 10, 2012

(65) Prior Publication Data

US 2013/0044420 A1     Feb. 21, 2013

(30) Foreign Application Priority Data

Aug. 19, 2011  (JP) ................................. 2011-179860
Jul. 25, 2012   (JP) ................................. 2012-164832

(51) Int. Cl.
| | |
|---|---|
| H05K 5/00 | (2006.01) |
| H05K 7/00 | (2006.01) |
| A47G 1/10 | (2006.01) |
| H01R 13/62 | (2006.01) |
| G06F 1/16 | (2006.01) |
| G06F 1/18 | (2006.01) |
| H01R 13/447 | (2006.01) |

(Continued)

(52) U.S. Cl.
CPC ............. *G06F 1/1616* (2013.01); *G06F 1/182* (2013.01); *H01R 13/447* (2013.01); *H01R 13/5213* (2013.01); *H01R 13/5219* (2013.01); *H01R 13/501* (2013.01)
USPC ............ 361/679.02; 361/679.03; 361/679.09; 361/679.31; 361/679.43; 361/679.45; 361/679.57; 361/679.58; 292/8; 292/11; 439/153

(58) Field of Classification Search
USPC ...................... 361/679.01–679.61, 807–832, 361/724–747; 345/168–169; 341/22; 439/60, 151–160, 327, 328, 331, 638; 248/917–924, 80–88, 155.1–155.5, 248/166–173, 180.1–186.2, 229.1–231.51, 248/271.4, 292.14, 316.1–316.8; 292/1–62, 292/113, 169.11–169.23, 341.11–341.19
See application file for complete search history.

(56) References Cited

U.S. PATENT DOCUMENTS

| 4,225,970 A | 9/1980 | Jaramillo et al. |
| 4,675,782 A | 6/1987 | Hibbert et al. |

(Continued)

FOREIGN PATENT DOCUMENTS

| CN | 201119175 Y | 9/2008 |
| CN | 201869967 U | 6/2011 |

(Continued)

*Primary Examiner* — Jerry Wu
(74) *Attorney, Agent, or Firm* — Hamre, Schumann, Mueller & Larson, P.C.

(57) ABSTRACT

A casing 1, a lid component 11 for covering a terminal 13 disposed in an opening of the casing 1, and a water sealing component 12 disposed around the terminal 13, are provided. The lid component 11 is structured such that a support portion 11*h* of a fixing portion 11*g* is rotatably fixed to the casing 1, and a slidable portion 11*b* slides relative to a lid portion 11*a*. Thus, a projection 11*c* is engaged with a recess 14, and a pair of engagement portions 11*f* engages with a pair of fixed projections 16. Thus, the lid component 11 engages with the casing 1 in three directions, and is held by being pressed against the water sealing component 12. With this structure, an electronic device having a lid component which can be assuredly locked is obtained.

5 Claims, 10 Drawing Sheets

(51) Int. Cl.
*H01R 13/52* (2006.01)
*H01R 13/50* (2006.01)

(56) References Cited

U.S. PATENT DOCUMENTS

| | | |
|---|---|---|
| 4,817,967 A | 4/1989 | Belter |
| 5,351,176 A | 9/1994 | Smith et al. |
| 5,435,780 A | 7/1995 | Ayles |
| 5,583,742 A | 12/1996 | Noda et al. |
| 5,634,807 A | 6/1997 | Saito |
| 6,038,087 A | 3/2000 | Suzuki et al. |
| 6,499,327 B1 | 12/2002 | Sugimoto |
| 6,588,335 B1 | 7/2003 | Bourrieres et al. |
| 6,697,258 B1 | 2/2004 | Muhlfeld et al. |
| 6,954,361 B2 | 10/2005 | Taubert et al. |
| 7,075,781 B2 * | 7/2006 | Peng ............... 361/679.55 |
| 7,563,113 B2 | 7/2009 | Sheng |
| 7,704,085 B1 | 4/2010 | Chang |
| 7,732,543 B2 | 6/2010 | Loch et al. |
| 7,762,861 B2 | 7/2010 | Verfuerth et al. |
| 7,789,437 B2 | 9/2010 | Sheng |
| 7,869,843 B2 | 1/2011 | Ladouceur et al. |
| 7,936,566 B2 | 5/2011 | Shigyo et al. |
| 8,089,757 B2 | 1/2012 | Chen et al. |
| 8,164,899 B2 | 4/2012 | Yamaguchi et al. |
| 8,199,464 B2 | 6/2012 | Zuo |
| 2009/0219676 A1 * | 9/2009 | Murakata ............. 361/679.01 |
| 2010/0033913 A1 | 2/2010 | Cao |
| 2010/0085691 A1 | 4/2010 | Yeh et al. |
| 2010/0110653 A1 | 5/2010 | Hisada |
| 2010/0313485 A1 | 12/2010 | Kuo |
| 2011/0013372 A1 | 1/2011 | Kang |
| 2011/0075338 A1 | 3/2011 | Tang et al. |
| 2011/0211300 A1 | 9/2011 | Mori et al. |
| 2012/0050077 A1 * | 3/2012 | Shih et al. ............. 341/22 |

FOREIGN PATENT DOCUMENTS

| | | |
|---|---|---|
| CN | 202308570 U | 7/2012 |
| JP | 10-284855 | 10/1998 |
| JP | 2005-347432 | 12/2005 |
| JP | 2007-279498 | 10/2007 |
| JP | 2009-003649 | 1/2009 |
| JP | 2009-054725 | 3/2009 |
| JP | 2009-223432 | 10/2009 |
| JP | 4538526 B | 9/2010 |
| KR | 20110007782 | 1/2011 |

* cited by examiner

ELECTRONIC DEVICE

BACKGROUND

1. Field

The present disclosure relates to waterproof and dustproof electronic devices having enhanced protection against, for example, water and dust.

2. Description of the Related Art

In recent years, electronic devices, such as notebook computers, have been provided with enhanced protection against exposure to water, drip, and dust that tends to occur when the electronic devices are used outdoors in various environmental conditions. Typically, such electronic devices are provided with a lid component that covers, for example, a terminal portion of the electronic device since the terminal portion is likely to be exposed to exterior conditions, such as dust or liquids, or the like, as a result of having a cable or the like, connected thereto. Such exposure to liquid, dust, or the like may cause the electronic device to malfunction.

Further, a housing section for housing components, such as a battery, which are detachably mounted to the electronic device, may have a waterproof lid. For example, a waterproof lid for covering an opening of a battery housing section so as to maintain waterproof property is disclosed in Japanese Laid-Open Patent Publication No. 2005-347432, and the waterproof lid includes: an operation case for an operation for attachment onto and detachment from the opening of the housing section; and a movable component which is movable in a space which is formed inside the operation case.

In the waterproof lid described in Japanese Laid-Open Patent Publication No. 2005-347432, the movable component has a protruding and retracting piece, and the protruding and retracting piece protrudes or retracts through a protrusion and retraction window formed in a side wall of the operation case, in conjunction with the movable component moving in the space of movement, and engages with or disengages from an engagement groove formed in an inner circumferential wall portion of the housing section. Further, the movable component can be moved by means of an operation boss through an operation window formed in the operation case.

SUMMARY

In the structure disclosed in Japanese Laid-Open Patent Publication No. 2005-347432, the movable component has to be moved in the surface direction of the waterproof lid in order to fix the waterproof lid having been placed in the opening of the battery housing section of the electronic device. Therefore, in order to lock the waterproof lid with the waterproof lid covering the opening, two steps of operations in different directions have to be performed. That is, an operation of blocking the opening with the waterproof lid, and an operation of moving the movable component in a direction perpendicular to a direction in which the opening is blocked, have to be performed. Further, a packing fixed to the waterproof lid for reliably obtaining waterproof property has elasticity, and therefore the movable component has to be moved with the waterproof lid being pressed against the opening. Therefore, a user-friendliness may not be sufficient.

An object of the present disclosure is to make available an electronic device having a lid component that can be assuredly locked with a simplified operation.

An electronic device of the present disclosure includes: a casing; a lid component for covering an opening formed in the casing; and a water sealing component disposed around the opening of the casing, and, in the electronic device, the lid component has one end portion fixed to the casing so as to allow the lid component to be rotatable, and the lid component engages with the casing in three directions except for a direction toward the one end portion, and is held by being pressed against the water sealing component.

In the electronic device according to the present disclosure, the lid component for covering the opening of the casing has one end portion fixed to the casing, and engages with the casing in three directions except for the direction toward the one end portion. Therefore, the lid component can be assuredly locked relative to the casing with a simplified operation.

DETAILED DESCRIPTION

Hereinafter, an embodiment will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of patent claims.

EMBODIMENTS

Figure 1:
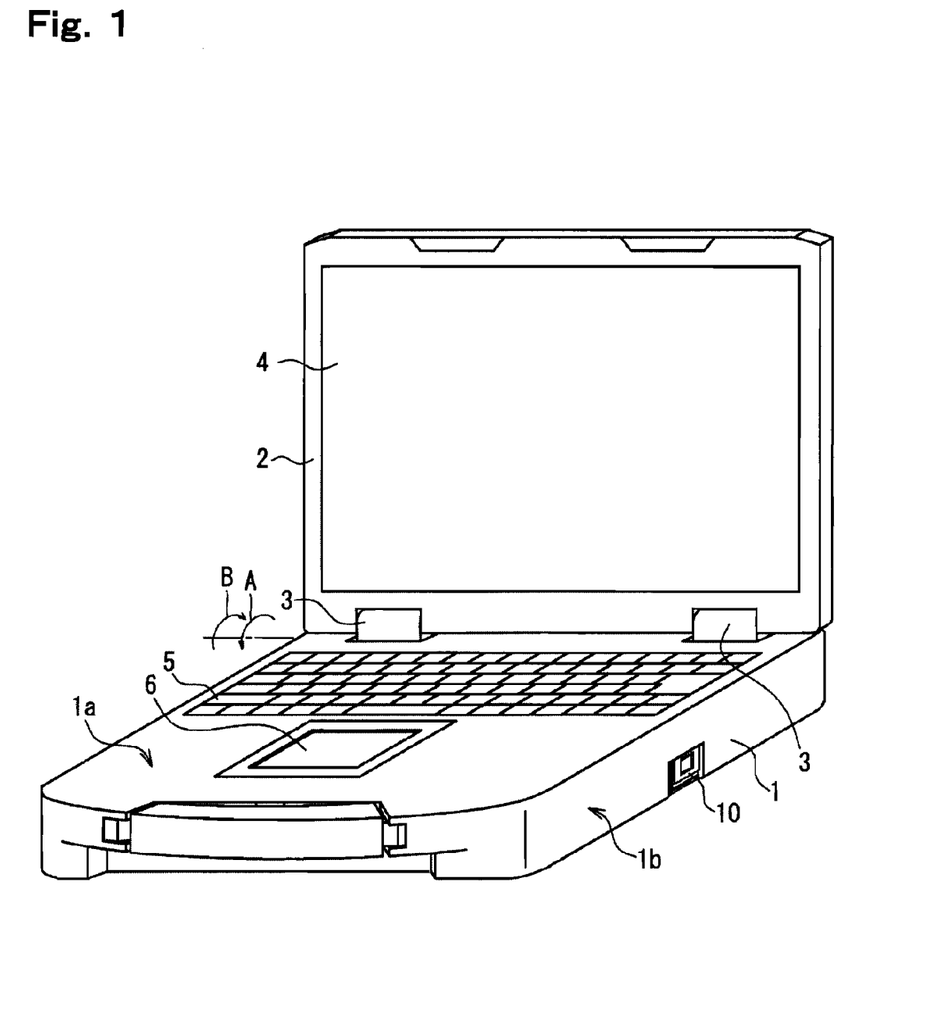
FIG. 1 is a perspective view of a schematic exemplary structure of a notebook computer according to an embodiment.

FIG. 1 is a perspective view of an outer appearance of a notebook computer, as an exemplary electronic device, according to the present embodiment. The present embodiment will be described by using a notebook computer as an exemplary electronic device. However, the electronic device may be a device that includes at least a lid component for covering an opening, of a casing, in which a terminal or the like is disposed.

As shown in FIG. 1, the notebook computer includes a first casing 1 and a second casing 2.

The first casing 1 houses various well-known devices to be built into a notebook computer, such as a hard disk drive and a circuit substrate having electric circuit elements mounted thereon. Detailed description and illustration thereof are omitted.

The second casing 2 includes a liquid crystal display 4 representing an exemplary display device. The first casing 1 and the second casing 2 are supported by means of a hinge portion 3 so as to be rotatable relative to each other. The hinge portion 3 has a pivot on which the first casing 1 and the second casing 2 are supported so as to be rotatable in the direction indicated by an arrow A or an arrow B. On a top surface 1a of the first casing 1 in the notebook computer, a keyboard 5 and a pointing device 6 are disposed. A terminal portion 10 is disposed in a side surface 1b of the first casing 1. In the following disclosure, a direction toward a side of the first casing 1 on which the keyboard 5 is disposed when the notebook computer is being used, represents an upward direction, and, by using this as appropriate, the components will be described.

Figure 2:
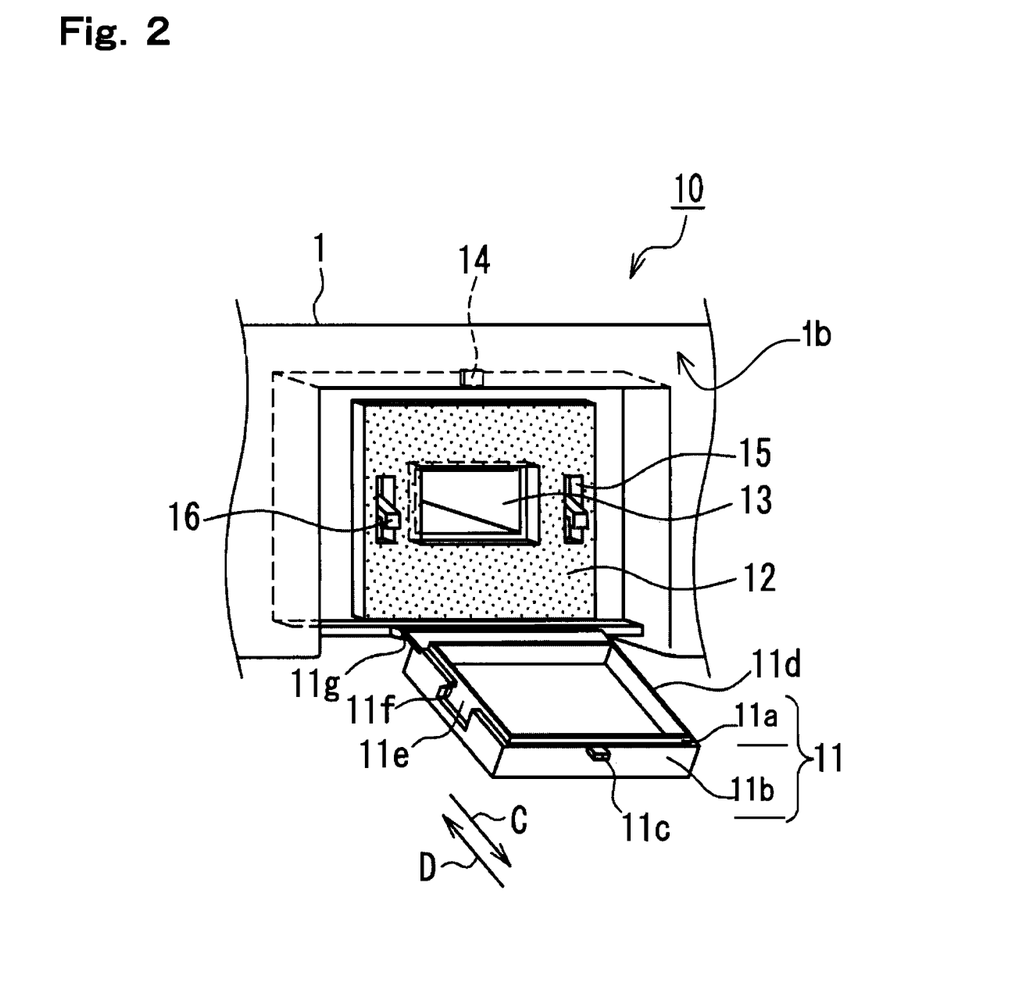
FIG. 2 is a perspective view of a terminal portion of the notebook computer according to the embodiment.

FIG. 2 is a perspective view of the terminal portion 10. The terminal portion 10 includes: a lid component 11; a water sealing component 12; a terminal 13 disposed in an opening formed in the casing 1; a recess 14; openings 15 formed in the water sealing component 12; and a pair of fixed projections 16 formed so as to project through the openings 15.

The lid component 11 is rotatably fixed to the first casing 1, and can shift between a closed position in which the terminal 13 is covered, and an opened position in which the terminal 13 is uncovered. The lid component 11 includes a lid portion 11a, a slidable portion 11b, and a fixing portion 11g. The lid portion 11a has an area in which the terminal 13 can be covered, and the lid portion 11a has one end portion fixed to the first casing 1 at the fixing portion 11g. The slidable portion 11b is disposed so as to oppose the side of the lid portion 11a opposite to the terminal 13 side thereof when the lid portion 11a is in the closed position, and the slidable portion 11b is movable relative to the lid portion 11a.

A rib 11d having a rectangular shape is formed, on a surface, of the lid portion 11a, which opposes the terminal 13 in the case of the lid portion 11a being in the closed position, so as to surround the periphery of the terminal 13. The rib 11d projects so as to be pressed against the water sealing component 12.

The slidable portion 11b is structured so as to be movable along the surface direction of the lid portion 11a in the direction away from the fixing portion 11g (the direction indicated by an arrow C in FIG. 2), and in the direction toward the fixing portion 11g (the direction indicated by an arrow D in FIG. 2). At the center of the side, of the slidable portion 11b, which is opposite to the fixing portion 11g side thereof and corresponds to the front end portion of the slidable portion 11b, a projection 11c is formed. Further, a pair of cut portions 11e is formed in the slidable portion 11b such that the cut portions 11e are formed at the center portions of both side surfaces, respectively, of the slidable portion 11b. The paired cut portions 11e have formed on the fixing portion 11g side engagement pieces 11f with which the fixed projections 16, respectively, engage on a pair of side surfaces of the lid portion 11a. When the lid component 11 is in the closed position in which the terminal 13 of the first casing 1 is covered, the slidable portion 11b is slid relative to the lid portion 11a in the direction indicated by the illustrated arrow C, whereby the projection 11c of the slidable portion 11b engages with the recess 14 formed in the first casing 1. Simultaneously when the projection 11c engages with the recess 14, the fixed projections 16 engage with the paired engagement pieces 11f formed on the side surfaces of the slidable portion 11b. The head portion of each fixed projection 16 which is formed so as to project through the openings 15 of the water sealing component 12 is hook-shaped, and engages with a corresponding one of the paired engagement pieces 11f. Thus, the lid component 11 is locked relative to the first casing 1 by means of the projection 11c formed at the front end portion, and the paired engagement pieces 11f formed on both the side surfaces, respectively, thereby maintaining a state where the water sealing component 12 is pressed by the rib 11d.

The water sealing component 12 is adhered so as to surround at least the periphery of the terminal 13, on the side surface 1b of the first casing 1. The water sealing component 12 is formed of an elastic material that exhibits recoverability for allowing the terminal 13 to be reliably waterproof, and may be formed of, for example, a silicone foam. The water sealing component 12 may be structured to be adhered to the first casing 1 by an adhesive tape or the like. Further, waterproof adhering means may be used for preventing entry of a liquid at least in between the water sealing component 12 and the first casing 1. In the present embodiment, the term, water sealing component, is used. However, the "water sealing component" represents a component that is able to prevent the entry of various liquids and solids, as well as water, regardless of the term. Namely, the water sealing component represents a component having waterproof (resistance to liquids, drips, etc.) and dustproof properties. When the opening of the casing is covered with the lid component by using the water sealing component, occurrence of, for example, electrical short-circuiting in the terminal due to entry of a liquid, a foreign object, or the like through an opening in which the terminal and the like are formed, can be prevented.

The terminal 13 is disposed in the opening formed in the side surface 1b of the first casing 1. The terminal 13 has a connector at the head of a cable for connecting between the notebook computer and another electronic device or the like which is externally provided, and the connector is connected to the other electronic device or the like. A form of the terminal 13, and a form of a through hole which is formed in the water sealing component 12 at a position at which the terminal 13 is disposed are determined according to the specifications of a connector provided at the head of a cable, such as a USB (universal serial bus) cable, to be connected. Detailed description of the structure of the terminal described in the present disclosure, such as positioning of electrode contacts, and a dividing frame made of a resin, is omitted.

The recess 14 is formed, in the opening of the first casing 1, at a position that opposes the fixing portion 11g across the terminal 13 in the case of the lid component 11 being in the closed position. The projection 11c can engage with or disengage from the recess 14 by the slidable portion 11b being slid when the lid component 11 is in the closed position. Therefore, the recess 14 is formed in a wall portion, of the first casing 1, which forms the opening as the terminal portion 10 in the side surface 1b of the first casing 1. In the lid component 11 according to the present embodiment, the lid portion 11a is fixed below the opening by means of the fixing portion 11g as shown in FIG. 2, and the slidable portion 11b slides in the upward and downward direction. Therefore, the recess 14 is formed in the wall portion above the opening such that the first projection 11c is moved upward to engage with the recess 14, or moved downward to disengage from the recess 14. The direction in which the recess 14 is formed is not limited to that described in the present embodiment. The recess 14 may be formed on the left or the right side of the wall portion, or on the lower side of the wall portion as long as the slidable component 11b can be slid toward the recess 14. The number of the recesses 14 is one and the number of the projections 11c is one in the present embodiment. However, a plurality of recesses 14 and a plurality of projections 11c may be provided. Further, in the present embodiment, the projection 11c is disposed at the center of the side containing the front end portion of the slidable portion 11b. However, the projection 11c may not be disposed at the center thereof. In this case, the recess 14 is formed at a position corresponding to a position at which the projection 11c is disposed. Further, the width of the recess 14 and the width of the slidable portion 11b, that is, the lengths thereof in the direction in which the side containing the front end portion of the slidable portion 11b extends, are not limited to the lengths in FIG. 2. For example, the length of the width of the projection 11c may be made almost equal to the length of the width of the side containing the front end portion of the slidable portion 11b, and the length of the width of the recess 14 may be increased according thereto.

Hereinafter, an opening and closing operation of the lid component 11 will be described.

Figure 3:
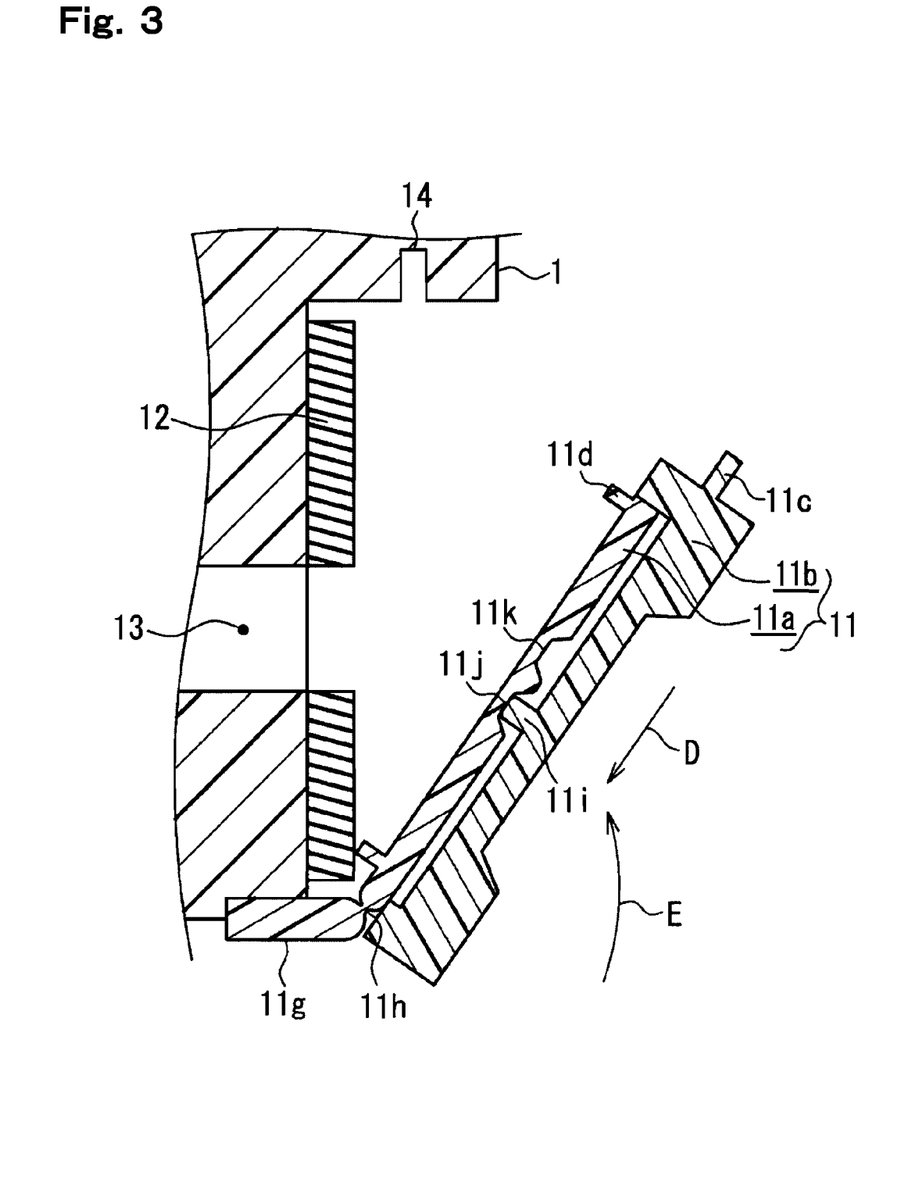
FIG. 3 is a cross-sectional view of a main portion of the terminal portion in which a lid component is in an opened position, in the notebook computer according to the embodiment.
Figure 4:
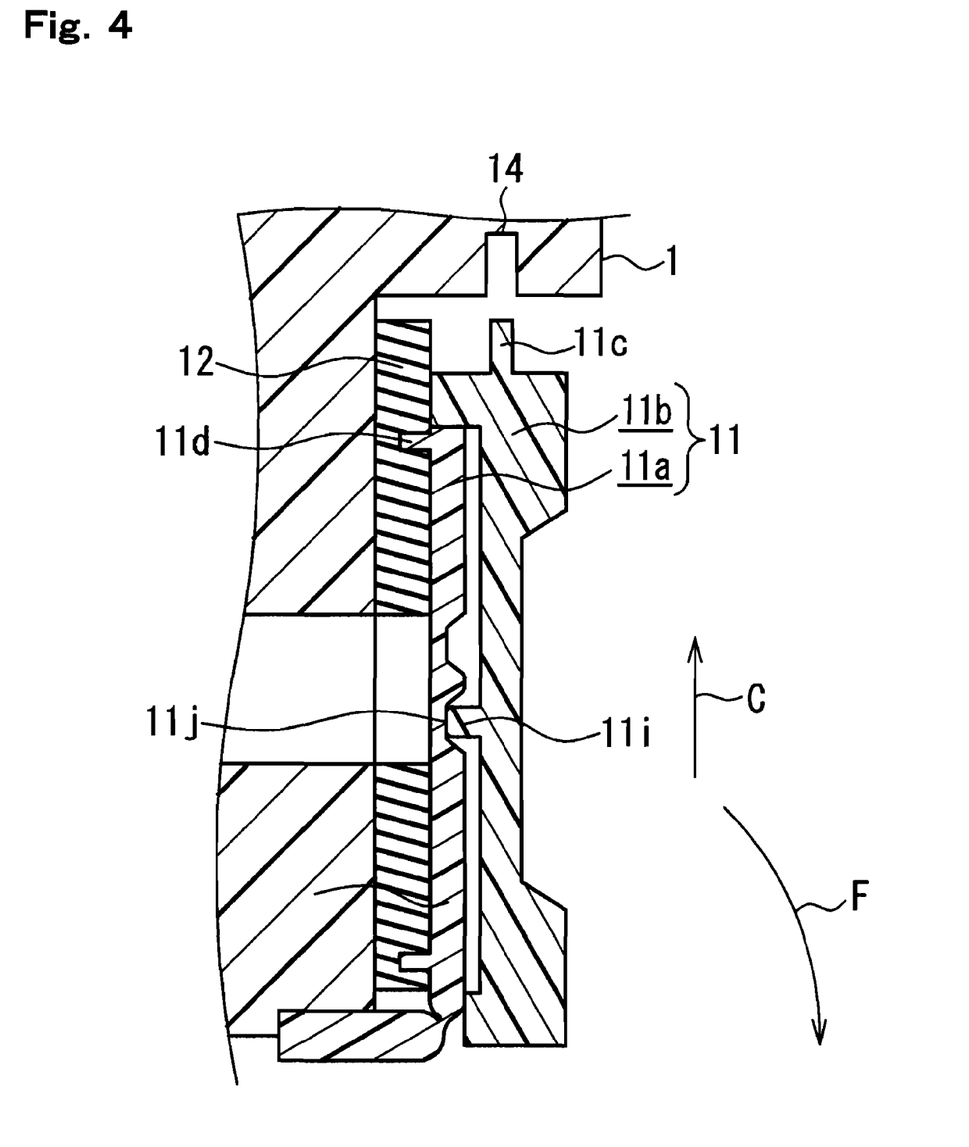
FIG. 4 is a cross-sectional view of a main portion of the terminal portion in which the lid component is in a closed position, in the notebook computer according to the embodiment.
Figure 5:
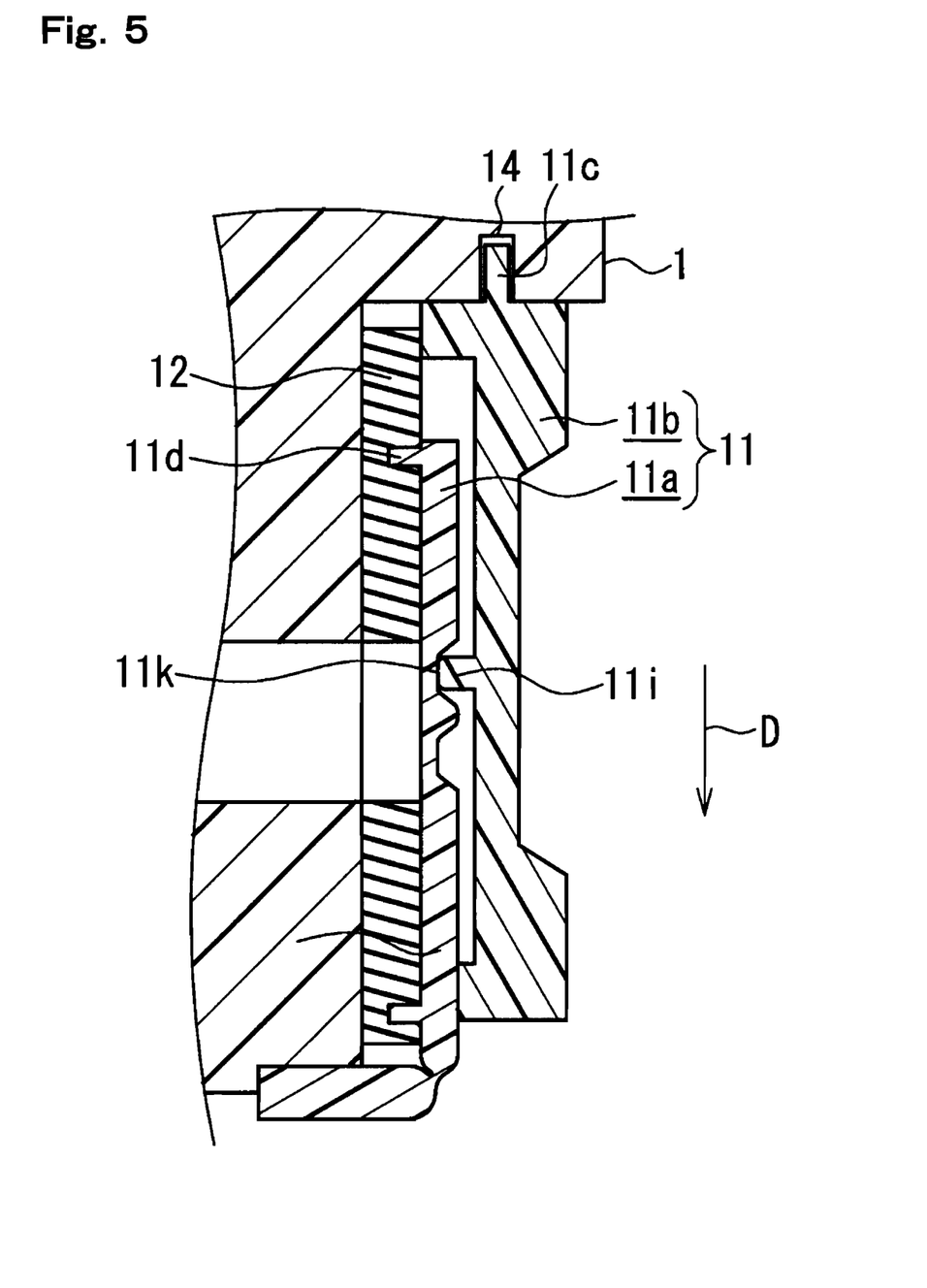
FIG. 5 is a cross-sectional view of a main portion of the terminal portion in a state where the lid component is locked, in the notebook computer according to the embodiment.

FIG. 3 is a cross-sectional view illustrating a state where the lid component 11 is in the opened position in which the opening of the first casing 1 is uncovered. FIG. 4 is a cross-sectional view illustrating a state where the lid component 11 is in the closed position in which the opening of the first casing 1 is covered. FIG. 5 is a cross-sectional view illustrating a state where the lid component 11 is locked in the closed position.

Firstly, as shown in FIG. 3, when the lid component 11 is shifted from the opened position to the closed position, the slidable portion 11b is moved, in the direction indicated by the arrow D, into a retracted position into which the projection 11c is retracted from the recess 14. When the lid component 11 is shifted from the opened position to the closed position, unless the slidable portion 11b is retracted into the retracted position, the projection 11c may abut against the first casing 1 or the like, which may prevent the lid component 11 from shifting to the closed position.

The slidable portion 11b is slidable between the retracted position shown in FIG. 3 and a protruded position in which the projection 11c protrudes in the direction toward the recess 14 as shown in FIG. 5. The slidable portion 11b includes a regulation projection 11i on a surface on a side opposing the lid portion 11a. On the other hand, the lid portion 11a includes a first regulation recess 11j and a second regulation recess 11k on a surface on a side opposing the slidable portion 11b. When the projection 11c of the slidable portion 11b is in the retracted position as shown in FIG. 3, the regulation projection 11i fits into the first regulation recess 11j, to regulate the slidable portion 11b positionally. On the other hand, when the projection 11c of the slidable portion 11b is in the protruded position (FIG. 5), the regulation projection 11i fits into the second regulation recess 11k, to regulate the slidable portion 11b positionally.

Next, the lid component 11 is moved in the direction indicated by an arrow E, to be disposed in the closed position in which the lid component 11 covers the opening. The lid component 11 rotates and moves in the direction indicated by the arrow E while being supported by a support portion 11h of the fixing portion 11g. As illustrated in detail in FIG. 3, the fixing portion 11g is fixed to the bottom surface of the first casing 1 by the use of, for example, screws. In the present embodiment, the support portion 11h for supporting the lid portion 11a and the fixing portion 11g is formed so as to have a reduced thickness such that the lid component 11 can smoothly rotate and move in the direction indicated by the arrow E in FIG. 3, and in the direction indicated by an arrow F in FIG. 4. The lid portion 11a and the fixing portion 11g may be supported in another manner, such as a manner using a pivot.

In the closed position shown in FIG. 4, the rib 11d formed on the lid portion 11a of the lid component 11 abuts against the water sealing component 12. Although the lid component 11 is structured so as to move to a position at which the rib 11d abuts against the water sealing component 12, the water sealing component 12 of the present embodiment has elasticity, and therefore the thickness of the water sealing component 12 is determined such that the rib 11d of the lid component 11 presses and deforms the water sealing component 12 in the closed position. Thus, the water sealing component 12 encloses the rib 11d of the lid component 11 in the closed position, and the rib 11d and the water sealing component 12 are in close contact with each other with an enhanced effectiveness, thereby enhancing reliability in waterproof property. Namely, when the rib 11d and the water sealing component 12 are in close contact with each other at the abutment surfaces, waterproof effect can be exhibited. However, when the abutment surface of the rib 11d which abuts against the water sealing component 12 is uneven to a minute degree, or when the surface of the rib 11d or the surface of the water sealing component 12 is deformed in the closed position, a minute gap occurs between the rib 11d and the water sealing component 12, and a liquid is likely to enter the terminal 13 through the gap. In the present embodiment, the water sealing component 12 is formed of a material which has elasticity exhibiting recoverability, and when the lid component 11 is shifted to the closed position, the rib 11d presses and deforms the water sealing component 12, thereby enhancing reliability in waterproof property.

When the slidable portion 11b of the lid component 11 is slid in the direction indicated by the illustrated arrow C in the closed position as shown in FIG. 4, the projection 11c is engaged with the recess 14 to lock the lid component 11 as shown in FIG. 5. Namely, as shown in FIG. 5, the slidable portion 11b is moved in the direction indicated by the arrow C, and the projection 11c is engaged with the recess 14. At this time, the slidable portion 11b is positioned so as to be in the locked state by the regulation projection 11i fitting into the second regulation recess 11k, and therefore movement of the lid component 11 into the opened position against the intention due to an impact on the lid component 11, can be prevented. Further, by the rib 11d for pressing and deforming the water sealing component 12, the water sealing component 12 has been pressed and deformed. Therefore, while the slidable portion 11b is moved in the direction indicated by the arrow C, the lid portion 11a and the slidable portion 11b merely slide relative to each other, and water sealing property in the rib 11d and the water sealing component 12 does not deteriorate.

When the locked position shown in FIG. 5 is shifted to the opened position, the slidable portion 11b is firstly moved in the direction indicated by the arrow D, and the regulation projection 11i is detached from the second regulation recess 11k, and is fitted into the first regulation recess 11j, and the lid component 11 is returned to the closed position shown in FIG. 4. By rotating the lid component 11 from the closed position in the direction indicated by the arrow F shown in FIG. 4, the lid component 11 can be moved to the opened position shown in FIG. 3.

Figure 6:
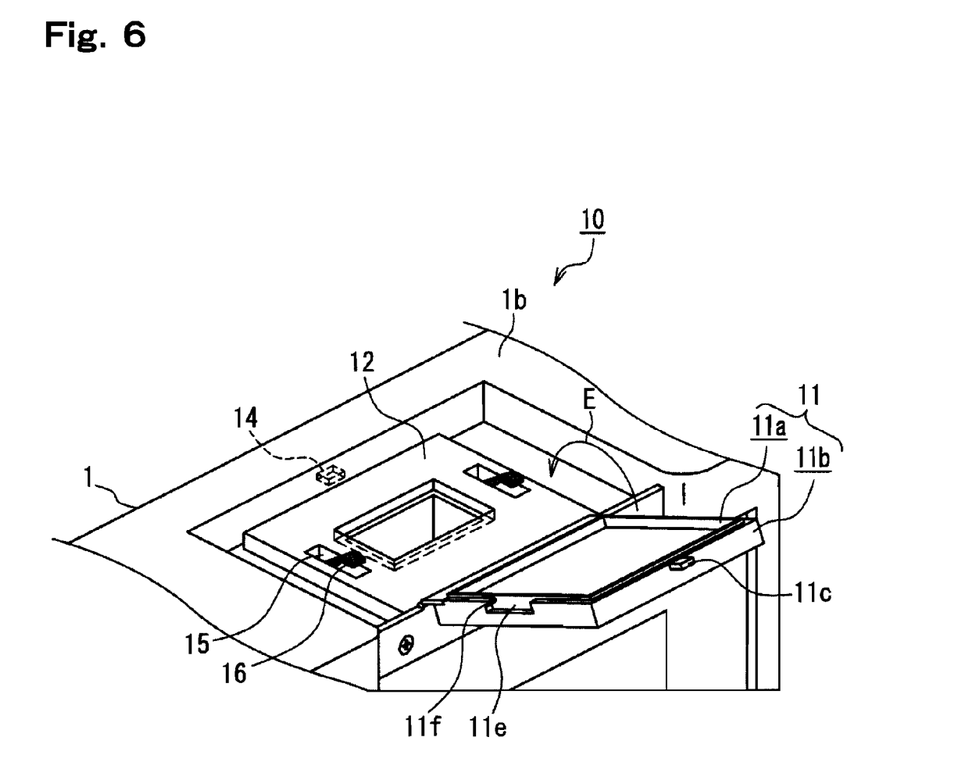
FIG. 6 is a perspective view of a locking mechanism for the lid component, illustrating a state where the lid component is in the opened position, in the notebook computer according to the embodiment.
Figure 7:
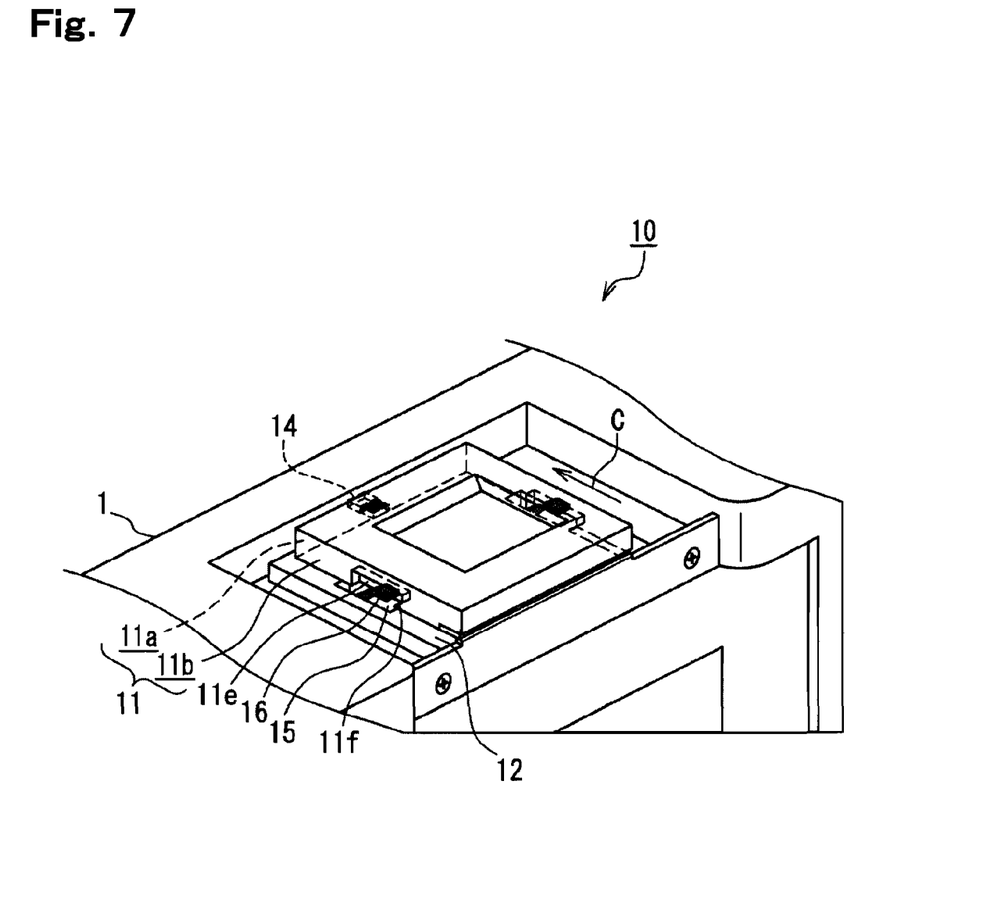
FIG. 7 is a perspective view of the locking mechanism for the lid component, illustrating a state where the lid component is in the closed position, in the notebook computer according to the embodiment.
Figure 8:
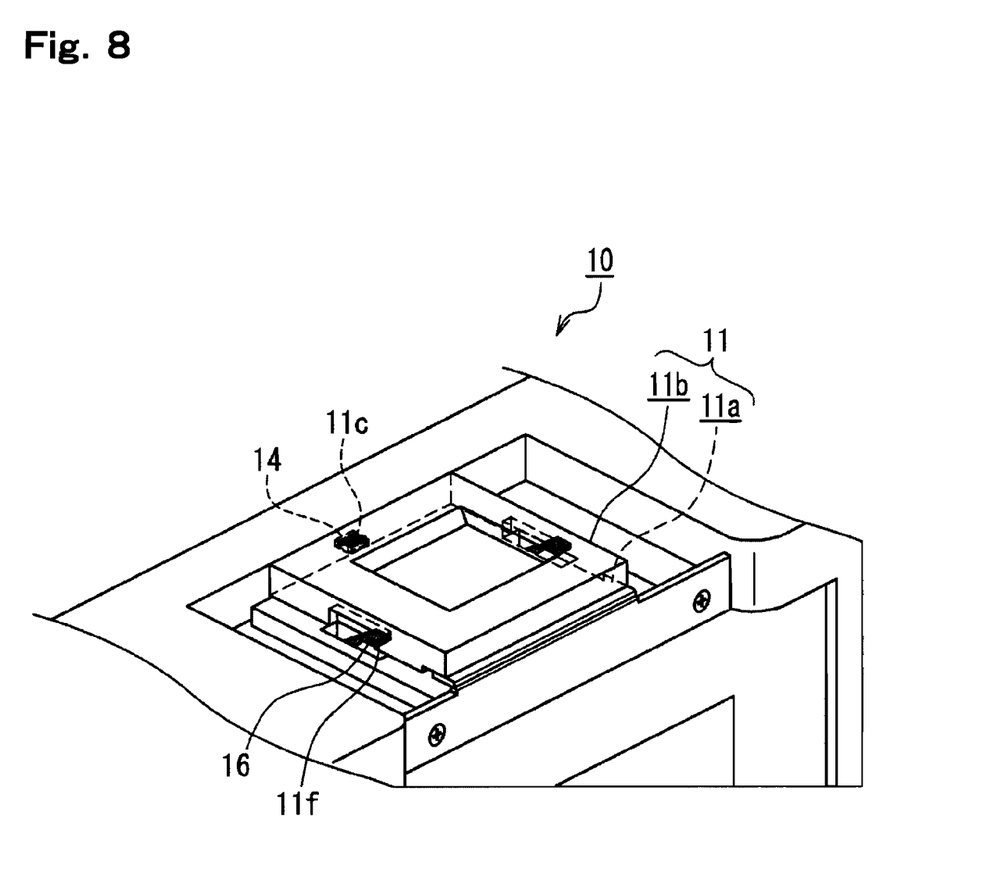
FIG. 8 is a perspective view of the locking mechanism for the lid component, illustrating a state where the lid component is locked, in the notebook computer according to the embodiment.

Next, a state where the paired engagement pieces 11f formed on the side surfaces of the slidable portion 11b engage with the fixed projections 16 provided in the first casing 1 when the lid component 11 opens and closes as shown in FIG. 3 to FIG. 5 will be described with reference to perspective views shown in FIG. 6 to FIG. 8. FIG. 6 is a perspective view illustrating a state where the lid component 11 is in the opened position as shown in FIG. 3. FIG. 7 is a perspective view illustrating a state where the lid component 11 is in the closed position as shown in FIG. 4. FIG. 8 is a perspective view illustrating a state where the lid component 11 is locked in the closed position as shown in FIG. 5.

FIG. 6 shows a state where the lid component 11 is opened relative to the side surface 1b of the first casing 1 at an angle greater than or equal to a right angle. In a case where a cable having, for example, a USB connector as the terminal 13 is connected, when the lid component 11 can be opened such that an interior angle between the lid component 11 and the side surface 1b of the first casing 1 is greater than or equal to a right angle, the lid component 11 can be fully opened relative to the side surface 1b, and the connection state of the terminal 13 can be checked from the exterior.

The lid component 11 is rotated from the position shown in FIG. 6 in the direction indicated by the illustrated arrow E, to shift the lid component 11 to the closed position.

In the closed position shown in FIG. 7, the lid component 11 abuts against the water sealing component 12 disposed on the side surface 1b of the first casing 1. At this time, the head portions of the paired fixed projections 16 that project through the paired openings 15 formed in the water sealing component 12 are inserted into the cut portions 11e formed on the paired side surfaces, respectively, of the slidable portion 11b. The head portion of one end portion of each fixed projection 16 is bent so as to be hook-shaped, and the other end portion is formed so as to be integrated with the bottom surface in the opening formed in the side surface 1b of the first casing 1. Further, since the head portion of each fixed projection 16 is bent so as to be hook-shaped, the cut portions 11e are each formed so as to have an increased width for allowing the hook-shaped head portion of each fixed projection 16 to be inserted therein.

By the slidable portion 11b being slid in the direction indicated by the illustrated arrow C, the lid component 11 shifts from the state shown in FIG. 7 to the locked state as shown in FIG. 8. For such a locked state, the slidable portion 11b is slid, the projection 11c formed at the front end portion of the slidable portion 11b is engaged with the recess 14 formed in the first casing 1, and simultaneously the engagement pieces 11f formed in the paired side surfaces of the slidable portion 11b and the head portions of the paired fixed projections 16, respectively, engage with each other. As described above, the recess 14 and the pair of fixed projections 16 are formed so as to be integrated with the first casing 1. Therefore, engagement with the pair of engagement pieces 11f and the projection 11c provided in the slidable portion 11b causes the lid component 11 to be locked relative to the first casing 1.

Namely, when the slidable portion 11b is slid relative to the lid portion 11a, the lid component 11 of the terminal portion 10 in the notebook computer is caused to be in the locked state in which the lid component 11 is held by fitting into the first casing 1 in three directions except for the direction toward the fixing portion 11g corresponding to the one end portion fixed to the first casing 1, that is, by fitting into the first casing 1 at the projection 11c provided at the front end portion of the lid component 11 and the pair of engagement pieces 11f provided on both the right and the left side surfaces. When the lid component 11 engages with the casing, at the front end portion and on both the side surfaces, in the three directions except for the direction toward the fixing portion 11g, a pressing force is applied from the entirety of the lid component 11 to the water sealing component 12. Therefore, the rib 11d which is formed in a rectangular-frame-shape on the lid portion 11a of the lid component 11 is in close contact with the water sealing component 12 with almost uniform force being applied from the entire surface of the rib 11d. Therefore, the lid component 11 becomes stable against the recovering force of the water sealing component 12 which is pressed and deformed by the rib 11d, thereby enabling enhancement of waterproof and dustproof properties in the locked state.

The terminal portion 10 described above as the embodiment is structured such that the number of the terminals 13 provided is one. However, the terminal portion 10 may be structured to have a plurality of terminals.

Figure 9:
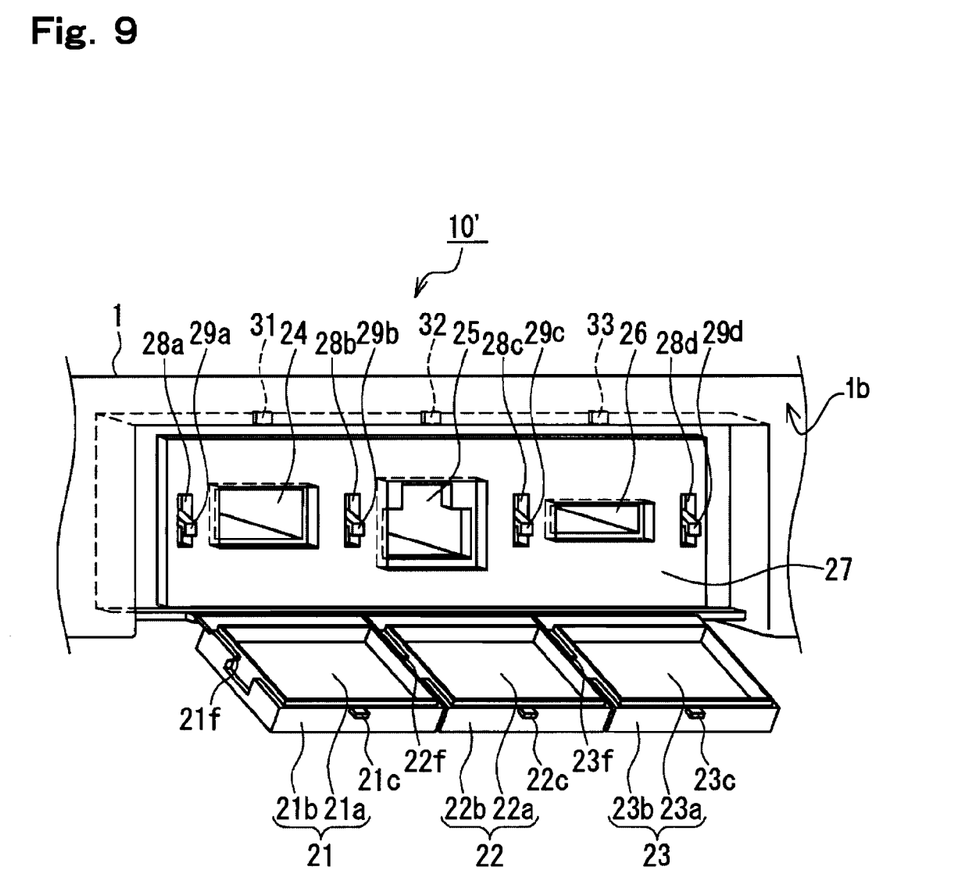
FIG. 9 is a perspective view of the terminal portion having a lid component according to a modification, in the notebook computer of the embodiment.

FIG. 9 is a perspective view illustrating another structure in which the number of the terminals is different from that described above.

As shown in FIG. 9, a terminal portion 10' provided in the side surface 1b of the first casing 1 has three terminals, that is, a first terminal 24, a second terminal 25, and a third terminal 26. A first lid component 21 is disposed so as to cover the first terminal 24. A second lid component 22 is disposed so as to cover the second terminal 25. A third lid component 23 is disposed so as to cover the third terminal 26. The three lid components, that is, the first to the third lid components 21, 22, and 23 are rotatably fixed to the first casing 1 independently of each other. The structure of each of the first lid component 21, the second lid component 22, and the third lid component 23 is the same as that of the lid component 11 shown in FIG. 2, and detailed description thereof is omitted.

The water sealing component 27 is disposed so as to surround the periphery of each of the first terminal 24, the second terminal 25, and the third terminal 26 provided in the side surface 1b of the first casing 1. The water sealing component 27 has through holes formed so as to correspond to positions at which the first terminal 24, the second terminal 25, and the third terminal 26 are formed. Thus, also when the number of the water sealing component 27 provided is one, entry of a liquid into each of the three terminals, that is, each of the first to the third terminals 24, 25, and 26 can be prevented. The structure and the material of the water sealing component 27 are the same as those of the water sealing component 12 shown in FIG. 2, and the detailed description thereof is omitted.

Further, the water sealing component 27 has four openings 28 (28a, 28b, 28c, 28d) formed therein, and four fixed projections 29 (29a, 29b, 29c, and 29d) are disposed so as to project through the openings 28, respectively. The four fixed projections 29a, 29b, 29c, and 29d engage with six engagement pieces 21f, 21f, 22f, 22f, 23f, and 23f which are disposed such that the engagement pieces form pairs, and corresponding paired engagement pieces are disposed on both side surfaces of each of slidable portions 21b, 22b, and 23b of the lid components 21, 22, and 23, respectively. Namely, a pair of engagement pieces 21f is provided such that the engagement pieces 21f are disposed on both side surfaces, respectively, of the slidable portion 21b of the lid component 21, a pair of engagement pieces 22f is provided such that the engagement pieces 22f are disposed on both side surfaces, respectively, of the slidable portion 22b of the lid component 22, and a pair of engagement pieces 23f is provided such that the engagement pieces 23f are disposed on both side surfaces, respectively, of the slidable portion 23b of the lid component 23. Further, projections 21c, 22c, and 23c formed on front end portions of the slidable portions 21b, 22b, and 23b of the lid components 21, 22, and 23 are engaged with recesses 31, 32, and 33, respectively, formed in the side surface 1b of the first casing 1, thereby locking the lid components 21, 22, and 23.

When the projection 21c of the first lid component 21 is engaged with the recess 31, the engagement piece 21f (which is visible and shown in FIG. 9) provided in the slidable portion 21b of the first lid component 21 engages with the first fixed projection 29a, and the engagement piece 21f (which is invisible and not shown in FIG. 9) provided in the slidable portion 21b of the first lid component 21 engages with the second fixed projection 29b. Further, when the projection 22c of the second lid component 22 is engaged with the recess 32, the engagement piece 22f (which is visible and shown in FIG. 9) provided in the slidable portion 22b of the second lid component 22 engages with the second fixed projection 29b, and the engagement piece 22f (which is invisible and not shown in FIG. 9) provided in the slidable portion 22b of the second lid component 22 engages with the third fixed projection 29c. Moreover, when the projection 23c of the third lid component 23 is engaged with the recess 33, the engagement piece 23f (which is visible and shown in FIG. 9) provided in the slidable portion 23b of the third lid component 23 engages with the third fixed projection 29c, and the engagement piece 23f (which is invisible and not shown in FIG. 9) provided in the slidable portion 23b of the third lid component 23 engages with the fourth fixed projection 29d. The four fixed projections 29 (29a, 29b, 29c, 29d) are bent so as to be hook-shaped on one head end portions which engage with the six engagement pieces 21f, 22f, and 23f provided in the three slidable components 21b, 22b, and 23b, similarly to the fixed projections 16, and the other end portions of the four fixed projections 29 are formed so as to be integrated with the bottom surface in the opening formed in the side surface 1b of the first casing 1. Therefore, the three lid components 21, 22, and 23 are locked relative to the first casing 1 independently of each other by the slidable portions 21b, 22b, and 23b provided in the three lid components, respectively, being slid.

Further, the two fixed projections 29b and 29c which are disposed in the mid-portion of the four fixed projections 29 disposed in the opening formed in the side surface 1b of the first casing 1, each lock two lid components disposed to the left and the right of the fixed projection. That is, the fixed projection 29b locks the lid component 21 and the lid component 22, and the fixed projection 29c locks the lid component 22 and the lid component 23. With this structure, the number of the openings 28 formed in the water sealing component 27 and the number of the fixed projections 29 formed so as to project through the openings 28, can be reduced. The reduction of the number of the openings 28 of the water sealing component 27 leads to reduction of possibility of entry of water from the exterior. Further, when the number of the fixed projections 29 is reduced, to enable one fixed projection 29 (each of the fixed projections 29b and 29c) to lock the lid components disposed to the right and the left of the one fixed projection 29, spacing at which terminals 24, 25, and 26 are disposed can be narrowed. Therefore, the size of the entirety of the terminal portion 10' can be reduced.

Except for the structure in which each of the fixed projections 29b and 29c disposed in the mid-portion locks the lid components disposed to the right and to the left thereof (the fixed projection 29b locks the lid component 21 and the lid component 22, and the fixed projection 29c locks the lid component 22 and the lid component 23), the rotation operation of the lid components 21, 22, and 23 and water sealing structure for the terminals 24, 25, and 26 in the terminal portion 10' shown in FIG. 9 are the same as those for the terminal portion 10 described with reference to FIG. 2, and FIG. 3 to FIG. 8, and the detailed description thereof is omitted.

As shown in FIG. 9, also when the number of terminals is plural such that the lids 21 to 23 are provided, the single water sealing component 27 can perform water sealing operation for all the lids 21 to 23. Therefore, as compared to a structure in which a water sealing component is independently provided for each terminal, the size of each terminal can be reduced, a density at which a plurality of terminals are arrayed can be enhanced, and the number of components and cost can be reduced. Further, when the first casing 1 is assembled, the single water sealing component 27 is merely adhered to the first casing 1 in the process step of adhering the water sealing component 27 to the first casing 1, thereby reducing process steps.

The water sealing component 27 may be provided on each of the lid components 21 to 23. In this case, the rib for elastically deforming the water sealing component is provided in each opening formed in the first casing 1. In this structure, an area of an opening formed by the rib to be formed around the terminal has to become greater than at least the outer form of a connector in the case of the connector having been connected to the terminal. On the other hand, in the present embodiment, the water sealing component 27 is disposed in the opening in the side surface 1b of the first casing 1, and the ribs are formed on the first lid portion 21a, the second lid portion 22a, and the third lid portion 23a. With this structure, the size of each rib is sufficient enough to abut against the water sealing component 27 around the terminals 24 to 26, and the size of connectors fixed to the terminals 24 to 26 may not be considered. Therefore, the areas of the lid components 21 to 23, and the entire size of the terminal portion in which the terminals 24 to 26 are arrayed, can be reduced.

In the present embodiment, the water sealing components 12 and 27 are formed of a silicone foam. However, the water sealing component may be formed of any material that has at least elasticity exhibiting recoverability and can prevent entry of a liquid. The water sealing components 12 and 27 are favorably formed of a single material in order to reliably obtain the water sealing property or waterproof property. The water sealing components 12 and 27 may be formed by using a silicone rubber, a nitrile rubber, or the like in order to obtain elasticity.

Moreover, in the present embodiment, the notebook computer is described as an exemplary electronic device. However, the electronic device may be any device which includes at least an opening formed in a casing, and a lid component for covering the opening. The present disclosure is applicable to various terminals mounted to, for example, mobile telephone terminals, hand-held game devices, digital cameras, other portable navigators, and other electronic devices. Further, the present disclosure is applicable to lid components for battery housing sections that can house batteries used as power supplies for portable devices, as well as the lid components for covering terminal portions having terminals formed in the opening.

Figure 10:
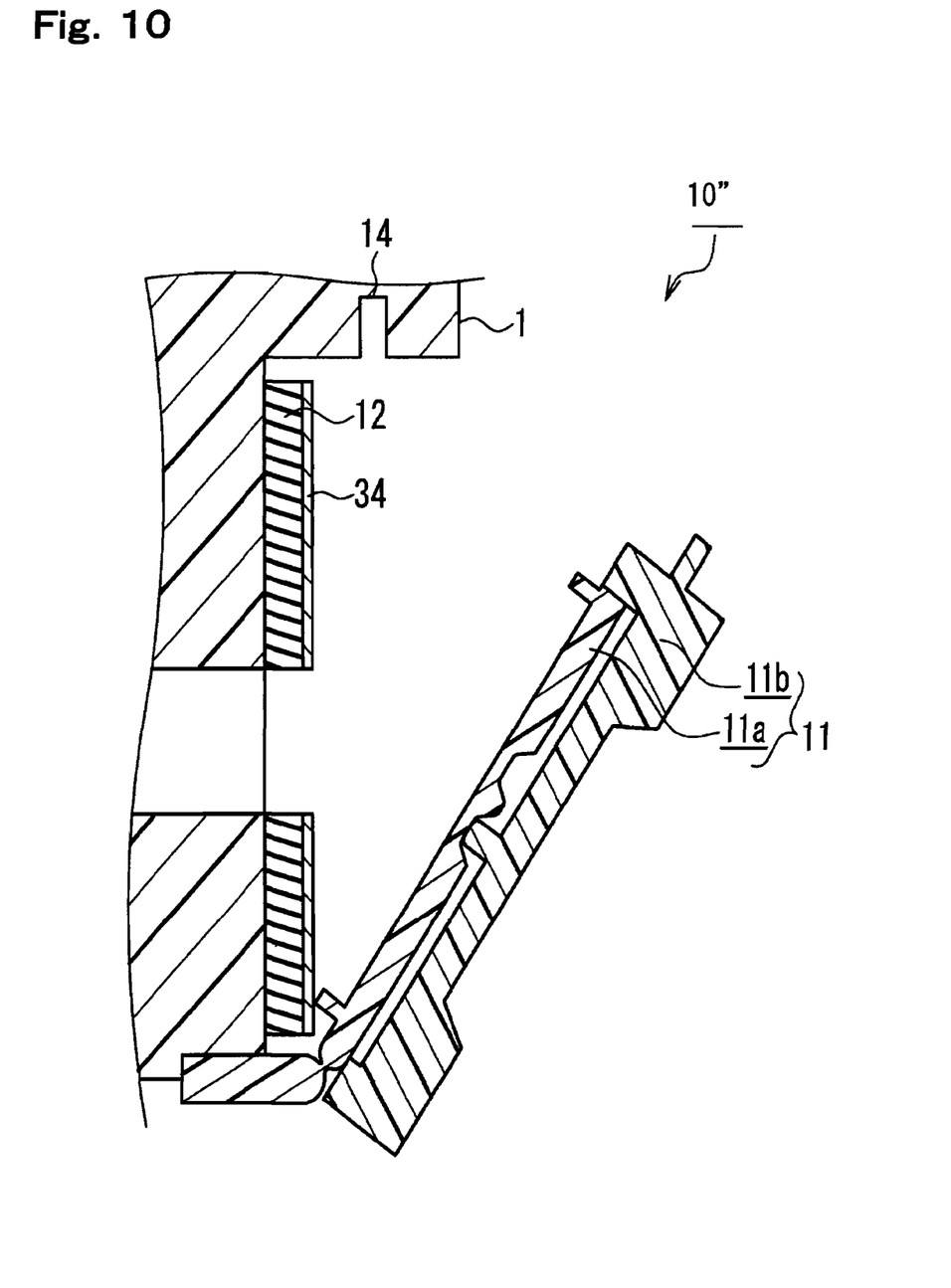
FIG. 10 is a cross-sectional view of a main portion of a water sealing component according to a modification, in the notebook computer of the embodiment.

As described above, in the present embodiment, the water sealing component formed of a silicone foam is provided. However, in general, a silicone foam does not have so high resistance to impact from the exterior. Therefore, if, for example, a user's erroneous handling causes a head portion of the connector to abut against the water sealing component near the terminal when the connector is mounted to the terminal, the water sealing component is likely to be damaged. In particular, a connector, such as a connector for a USB cable, which is formed of a metal or has a sharp head portion, is more likely to damage the water sealing component. Therefore, as in a terminal portion 10'' shown in FIG. 10, a protective film 34 may be formed on the surface (a surface on a side that opposes the lid component 11 in the closed position) of the water sealing component 12. The protective film 34 may be formed of a soft resin, which is less likely to be damaged even if impact is applied from the exterior. The thickness of the protective film 34 may be, for example, 0.5 mm in light of the strength of the protective film 34 itself, and a spacing between the first casing 1 and the lid component 11.

In the structure shown in FIG. 9, on the side surface 1*b* which is one of the surfaces of the first casing 1, a plurality of terminals 24, 25, and 26 are provided. However, also when a plurality of terminals are provided on a plurality of surfaces of the first casing 1, one water sealing component can perform water sealing operation on each surface as in the present embodiment.

Further, the lid portion 11*a* or the slidable portion 11*b* may be formed of a material having flexibility. Namely, when the slidable portion 11*b* is moved in the direction indicated by the arrow C or D in FIGS. 4 and 5, the regulation projection 11*i* moves on a raised portion between the first regulation recess 11*j* and the second regulation recess 11*k*. At this time, when the lid portion 11*a* or the slidable portion 11*b* is formed of a material having flexibility, the raised portion between the first regulation recess 11*j* and the second regulation recess 11*k*, or the regulation projection 11*i* is deformed, thereby moving the slidable portion 11*b* smoothly in the direction indicated by the arrow C or D. The lid portion 11*a* or the slidable portion 11*b* may be formed of a material having elasticity, such as an elastomer resin, in particular, an elastically deformable elastomer resin (for example, a polybutylene terephthalate resin, a nitrile rubber, a silicone rubber, or the like). Further, when the lid portion 11*a* is formed of a material having flexibility, the fixing portion 11*g* integrated with the lid portion 11*a* may have flexibility. In a case where the fixing portion 11*g* has flexibility, even when the lid component 11 is repeatedly opened and closed, damage due to fatigue of the fixing portion 11*g* can be alleviated.

The specific structures of the lid portion 11*a* and the slidable portion 11*b* of the lid component 11 are not limited to those shown in FIG. 2 to FIG. 8. The structure in which the slidable portion 11*b* moves relative to the lid portion 11*a*, and is regulated positionally at a predetermined regulation position, may be as follows. For example, a regulation projection may be disposed on the lid portion, and the regulation recess may be formed on the slidable portion. Alternatively, a pair of regulation projections may be formed such that the regulation projections have slopes, on the lid portion and the slidable portion on sides, respectively, thereof that oppose each other. Further, if the structure in which the lid component fits into the casing in three directions except for the direction toward the fixing portion, is not the structure described above for the embodiment, the same effect can be obtained. For example, a fitting recess may be formed at the front end portion of the lid component on the side opposite to the side on which the fixing portion is disposed, and a projection may be formed on the casing. Further, the form of the fitting component on each side surface and a position at which the fitting component is disposed are not limited to the exemplary ones described above.

As described above, the embodiments have been described as an exemplary technique of the present disclosure. For that purpose, the accompanying drawings and the detailed description are provided.

Therefore, components indicated in the accompanying drawings and the detailed description may include not only components which need to be provided in order to solve the problems, but also components which need to be illustrated for describing the technique but may not be provided for solving the problems. Therefore, the components which may not be provided should not be instantly construed as being indispensable even if the components which may not be provided are indicated in the accompanying drawings and the detailed description.

Further, the embodiments described above are intended to illustrate the technique of the present disclosure. Various modifications, replacements, additions, and deletions may be devised within the scope of claims or within the equivalent scope.

What is claimed is:

1. An electronic device comprising: a casing; the casing has a plurality of openings formed therein so as to be adjacent to each other;
   a plurality of lid components for covering the plurality of the openings, respectively, each of the plurality of lid components having a rectangular shape, for covering corresponding opening formed in the casing; and
   a water sealing component that is fixed around the plurality of openings of the casing, wherein
   each of the lid components has a rib on a surface that opposes the water sealing component in a closed position in which the lid component is closed, the rib surrounding the periphery of the corresponding opening, and
   each of the lid components has one side fixed to the casing so as to allow the lid component to be rotatable, and the lid component engages with the casing on three sides except for the one side, and is held in a state where the rib is pressed against the water sealing component in the closed position; and
   the casing has a plurality of fixed projections,
   each of the plurality of lid components has engagement pieces formed in two sides opposing each other,
   the engagement pieces engage with the fixed projections in the two sides among the three sides, and
   one of the fixed projections disposed between two of the openings adjacent to each other engages with the engagement piece of the lid component that covers one of the two openings, and the engagement piece of the lid component that covers the other of the two openings.

2. The electronic device according to claim 1, wherein the water sealing component disposed around the plurality of the opening is formed as one component.

3. The electronic device according to claim 1, wherein the lid component includes:
   a lid portion, having the one side fixed to the casing, configured to abut against the water sealing component, and
   a slidable portion movable relative to the lid portion in a direction away from the one side and in a direction toward the one side, and
   the slidable portion moves in the direction away from the one side, to engage with the casing on the three sides.

4. The electronic device according to claim 1, wherein the water sealing component disposed around the plurality of the opening is formed as one component.

5. The electronic device according to claim 1, wherein a terminal to which a connector is connected is disposed in the opening.

\* \* \* \* \*